US008117562B2

(12) United States Patent
Getsch

(10) Patent No.: US 8,117,562 B2
(45) Date of Patent: Feb. 14, 2012

(54) RUNTIME MODIFICATION OF DATA PRESENTED IN A GRAPHICAL ELEMENT

(75) Inventor: Timothy E. Getsch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 896 days.

(21) Appl. No.: 11/260,652

(22) Filed: Oct. 26, 2005

(65) Prior Publication Data

US 2007/0094608 A1 Apr. 26, 2007

(51) Int. Cl.
*G06F 3/048* (2006.01)
(52) U.S. Cl. .................. 715/843; 715/841; 707/805
(58) Field of Classification Search .............. 715/700, 715/762, 738, 826, 828, 841, 843; 707/665–671, 707/696, 803, 805
See application file for complete search history.

(56) References Cited

U.S. PATENT DOCUMENTS

| 5,457,797 A * | 10/1995 | Butterworth et al. ......... 719/320 |
| 5,809,266 A * | 9/1998 | Touma et al. ................. 715/764 |
| 5,844,554 A * | 12/1998 | Geller et al. ................. 715/744 |
| 6,108,004 A * | 8/2000 | Medl ............................ 715/804 |
| 6,636,242 B2 * | 10/2003 | Bowman-Amuah .......... 715/764 |
| 2004/0133526 A1 * | 7/2004 | Shmueli et al. ................. 705/80 |
| 2004/0243931 A1 * | 12/2004 | Stevens et al. ................ 715/513 |
| 2005/0193033 A1 * | 9/2005 | Davis et al. .................... 707/201 |
| 2005/0256852 A1 * | 11/2005 | McNall et al. .................... 707/3 |
| 2006/0235828 A1 * | 10/2006 | Dettinger et al. .................. 707/3 |
| 2006/0259503 A1 * | 11/2006 | Bradateanu et al. .......... 707/102 |
| 2007/0064012 A1 * | 3/2007 | McCall ......................... 345/619 |
| 2007/0168373 A1 * | 7/2007 | Dettinger et al. ............. 707/101 |

* cited by examiner

*Primary Examiner* — Ba Huynh
(74) *Attorney, Agent, or Firm* — Merchant & Gould

(57) ABSTRACT

The present invention provides ways for application programs to allow users to dynamically update data that is presented in a GUI element. In one aspect of the present invention, a method is provided that receives a command when a GUI element is displayed for the purpose of updating one or more data item(s) presented in the GUI element. In response to receiving the command, the method causes the updated data to be obtained from the user and stored in a database. Then the GUI element is "refreshed" so that the updated data is available in the GUI element for selection by the user.

20 Claims, 4 Drawing Sheets

| 202 STUDENT | 204 YEAR | 206 GRADE |
|---|---|---|
| BOB | 12 | A |
| TIM | 11 | B |
| STEWART | 9 | A |
| TRACY | 12 | D |
| MIKE | 10 | C |

*Fig.2.*

MATH CLASS

| STUDENT ▼ | YEAR | GRADE |
|---|---|---|
| BOB<br>TIM<br>STEWART<br>TRACY<br>MIKE | 12 | C |

RUNTIME MODIFICATION OF DATA PRESENTED IN A GRAPHICAL ELEMENT

BACKGROUND

A user interface is a portion of a program with which a user interacts. Types of user interfaces include, but are not limited to, command-line interfaces, menu-driven interfaces, and graphical user interfaces ("GUIs"). A windowing environment is a type of GUI that presents the user with specially delineated areas of the screen called windows that may be resized and moved around on the display of a computer. The Macintosh OS® and Microsoft Windows® are both examples of windowing environments that provide means for a user to interact with an application. Those skilled in the art and others will recognize that, increasingly, application programs are designed for windowing environments to assist user in performing task(s), such as word processing, accounting, database management, and the like.

Modem operating systems are primarily windowing environments that present graphical elements as opposed to purely textual elements. Typically, application programs employ graphical elements derived from the operating system which results in a common "look and feel" between the different application programs installed on the same computer. Commonly used GUI elements include, but are not limited to, menus, buttons, check boxes, scroll bars, listboxes, comboboxes, and the like. Those skilled in the art and others will recognize that each GUI element is presented as an image composed of pixels on a computer display. Moreover, generally described, different GUI elements provide alternative ways for presenting and/or interacting with the user. For example, check boxes are designed to obtain Boolean-type input from a user in that a property displayed in the checkbox is in one of two possible states (e.g., selected or unselected). By way of another example, a listbox will typically present different variables in a list of items, any of which may be selected by the user. Thus, a variety of GUI elements may be presented to a user in a windowing environment depending on the type of input that is needed.

As GUIs have become ubiquitous, many object-oriented tools were developed that facilitate the use of GUI elements in a program. In some operating systems, a GUI element is defined as a class from which objects or instances of the class may be created. Moreover, data presented to the user in a GUI element is typically stored in a underlying data store that allows relationships to be defined between the data. When a GUI element is scheduled to be displayed to the user, an object or other program code retrieves data from the data store. For example, in the case of a listbox, a plurality of data items may be retrieved from a data store and displayed as variables in the listbox. In this example, the data retrieved from the data store is referred to as being "bound" to the GUI element in which the data is displayed.

In existing systems, once a GUI element has been displayed, the user is unable to easily add or otherwise modify data items presented in the GUI element. For example, data may be retrieved from an underlying data store for display in a GUI element that is user-defined metadata. In this example, the metadata will typically be obtained and stored in the data store using a previously executed process or program. Moreover, when the metadata is displayed to the user in the GUI element, the user is unable to add or otherwise modify the data. Stated differently, data presented in a GUI element may not be modified at runtime during the execution path of an application program. As a result, execution of a program that displays a GUI element may need to be interrupted so that the process or program that maintains functionality for obtaining the underlying data may be executed.

While specific disadvantages of existing systems have been illustrated and described in this Background Section, those skilled in the art and others will recognize that the subject matter claimed herein is not limited to any specific implementation for solving any or all of the described disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the present invention are directed at allowing one or more data item(s) presented in a GUI element to be dynamically updated during execution of an application program. Generally stated, a user is regularly presented with GUI elements (e.g., radio buttons, listboxes, comboboxes, and the like) that are used by an application programs to obtain input from the user. Unfortunately, data items presented in a GUI element may not be easily modified without requiring a user to explicitly execute a separate process or program. However, aspects of the present invention are directed at allowing data items presented in a GUI element to be modified dynamically without requiring a user to explicitly execute a separate process or program. More specifically, when of GUI element is presented, the user may issue a command that indicates one or more data item(s) presented in the GUI element should be modified. Then, in one embodiment, data that describes the updated data item(s) is obtained and stored in an underlying database. Once the updated data item(s) have been obtained, the GUI element is "refreshed" with the updated data item(s) being displayed and available for selection by the user.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a pictorial depiction of an exemplary table in a database that includes data items which may be updated at runtime by software components included in the computer illustrated in FIG. 1;

FIG. 3 is a pictorial depiction of an exemplary form with GUI elements that display data items which may be dynamically updated by software components included in the computer illustrated in FIG. 1;

DETAILED DESCRIPTION

The present invention may be described in the general context of computer-executable instructions, such as program modules, being executed by a computer. Generally described, program modules include routines, programs, widgets, objects, components, data structures, and the like that perform particular tasks or implement particular abstract data types. The present invention may also be practiced in distributed computing environments where tasks are performed by remote processing devices that are linked through a communications network. In a distributed computing environment, program modules may be located on local and/or remote computer storage media.

Generally described, a method, software system, and computer-readable medium are provided for allowing data presented in a GUI element to be dynamically updated. In one aspect of the present invention, a method is provided that may receive notice of a command when a GUI element is displayed for the purpose of updating one or more data item(s) presented in the GUI element. In response to receiving a command, the method causes the updated data to be obtained from the user and stored in a database. Once stored, any application program, form, template, and the like may retrieve the updated data. Moreover, once the updated data has been obtained, the method causes the GUI element to be "refreshed" so that the updated data is available for selection by the user.

Figure 1:
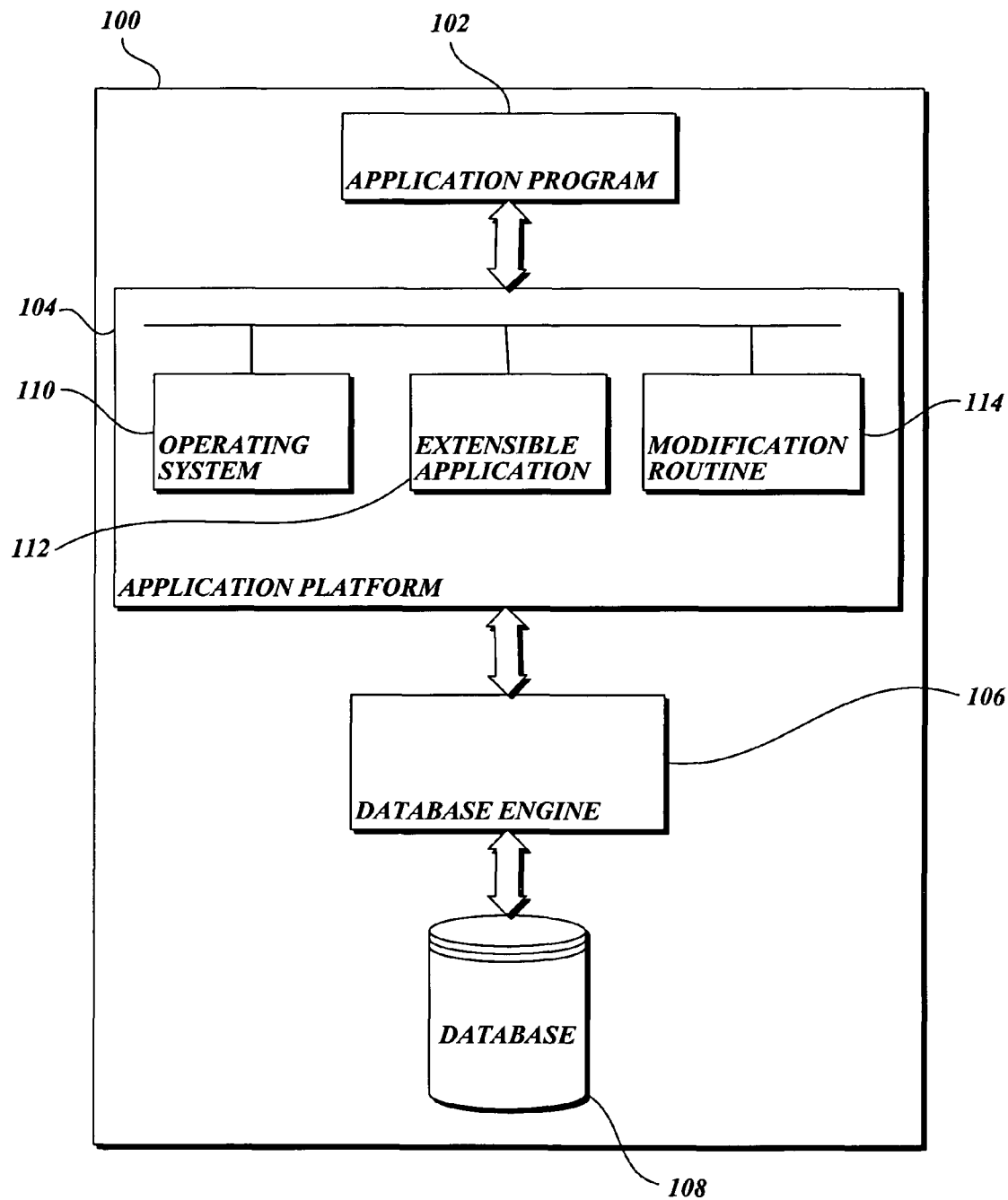
FIG. 1 is a block diagram of an exemplary computer that includes components suitable for dynamically updating data items displayed in a GUI element.

Now with reference to FIG. 1 an exemplary computer 100 in which embodiments of the present invention may be implemented will be described. As illustrated in FIG. 1, the exemplary computer 100 includes an application program 102, an application platform 104, a database engine 106, and a database 108. Moreover, as further illustrated in FIG. 1, the application platform 104 includes an operating system 110, an extensible application program 112, and a modification routine 114. Those skilled in the art and others will recognize that the computer 100 illustrated in FIG. 1 may be any one of a variety of computing devices including, but not limited to, personal computing devices, server-based computing devices, personal digital assistants ("PDAs"), cellular telephones, tablet computers, other electronic devices having some type of memory, and the like. For ease of illustration and because they are not important for an understanding of the present invention, FIG. 1 does not show some of the typical components of many computers, such as memory, a central processing unit, etc.

Generally described, the application platform 104 provides services to application programs (e.g., application program 102) installed on the computer 100 that, among other things, allow the application programs to execute desired tasks. In this regard, the application program 102 illustrated in FIG. 1 may be any computer program that causes a GUI element to be displayed including, but not limited to, database applications, editors, word processors, spreadsheets, browsers, and the like.

In one embodiment of the present invention, the application program 102 accesses the services provided by the extensible application 112. Increasingly, application programs are designed to allow other application programs to extend their functionality. For example, a currently available application program commonly known as a Web browser allows other applications to extend the program's functionality. In this regard, a Web browser from Microsoft® Corporation known as Internet Explorer® allows users to create toolbars, browser helper objects ("BHO"), common object model ("COM") objects, and the like for the purpose of extending the functionality to the Web browser. By way of another example, extensible database applications such as FileMaker Pro®, Microsoft Access®, MySQL and Oracle® allow programs to extend their fuinctionality to serve the customized needs of organizations and users. Since these types of database applications provide a large number of services to users they are commonly referred to as Database Management Systems ("DBMS").

In one exemplary embodiment, the extensible application 112 is a Database Management System that, in conjunction with other software components, provides services to other application program. Those skilled in the art and others will recognize that a Database Management System is a control system that supports database features including, but not limited to, storing and retrieving data from a database. For example, in the context of FIG. 1, the extensible application 112 may be a Database Management System that communicates with the database engine 106 through an application programming interface ("API") for the purpose of accessing data items in the database 108.

Those skilled in the art and others will recognize that a database is a collection of related data that is stored on a memory medium. Generally described, queries are used to access data in the database 108 and may be constructed in a Structured Query Language ("SQL"). In this regard, the application program 102 may access data in the database 108 by generating a request for the data and passing the request to the application platform 104. When received, the extensible application 112 generates a query for identifying data that will be extracted from the database 108 and passes the query to the database engine 106. In response, the database engine 106 extracts the requested data (sometimes referred to as the "result set") from the database 108. Then the database engine 106 passes the requested data back to the application platform 104 which communicates the data to the application program 102.

As illustrated in FIG. 1, the application platform 104 includes the operating system 110 which may be a general-purpose operating system, such as a Microsoft® operating system, UNIX® operating system, or Linux® operating system. Alternatively, the operating system 110 may be a specialized operating system designed specifically for a computer that maintains non-generic hardware. In any event, those skilled in the art and others will recognize that the operating system 110 controls the general operation of the computer 100 and is responsible for management of hardware and basic system operations, as well as executing programs. Since the operating system 110 manages hardware resources on the computer 100, the application program 102 and other non-privileged software components of the computer 100 are not able to directly access data that is stored on a hardware device. In this regard, the operating system 110 insures that computer programs, such as application 102, are able to use hardware resources on the computer 100. For example, the database 108 is a logical organization of related data that is physically stored on a memory medium (not shown). When data in the database 108 needs to be accessed, the operating system 110 is used to read the data from the memory medium.

In one embodiment of the present invention, the extensible application 112 and the operating system 110 provide services that may be used to build application programs. For example, in some systems, a database is commonly organized into basic units referred to as "tables," each of which is comprised of a two-dimensional row ("field") and column ("record") of database entries. Generally described, each table in a database contains entries of related subject matter. Moreover, tables frequently maintain relationships with other tables and cross reference each other by inserting a foreign key into a field in the table. Some Database Management Systems, allow application programs to create forms which provide graphical representations of the data in a table. Those skilled in the art and others will recognize that forms are a useful way of obtaining specific information in a desired format. For example, Database Management Systems will typically present GUI elements on a form so that users may easily input data into the computer 100.

As mentioned above, frequently used GUI elements that may be included on a form or other graphical system include, but are not limited to, menus, buttons, check boxes, scroll bars, listboxes, comboboxes (also known as drop-down menus), and the like. Frequently, GUI elements present data items that may be selected by a user for the purpose of inputting data into the computer 100. In existing systems, the data items presented in a GUI element may either be identified programmatically or obtained by directing a query to the database that stores the data items. In either instance, the user is unable to dynamically modify data items presented in a GUI element at runtime when the GUI element is presented in during the execution path of an application program.

As will be better understood from the description provided below with reference to FIG. 5, certain aspects of the present invention are implemented in the modification routine 114. Generally described, the modification routine 114 is an event-driven routine that dynamically updates data presented in a GUI element. As a result, GUI elements that are encountered during the execution path of an application program form may be updated and "refreshed" without having to interrupt execution of an application program.

When software that is formed in accordance with the present invention is implemented in a computer, for example of the type illustrated in FIG. 1, the computer provides a way for users to dynamically update data items that are presented in a GUI element. Allowing a user to update a data item enhances the computer experience by making application programs more flexible and easier to use. As known to those skilled in the art and others, FIG. 1 is a simplified example of one computer 100 capable of performing the functions of the present invention. However, actual embodiments of the computer 100 will have additional components not illustrated in FIG. 1 or described in the accompanying text. Moreover, FIG. 1 shows one component architecture capable of implementing the present invention but other component architectures are possible.

For illustrative purposes and by way of example only an exemplary table 200 in a database is illustrated in FIG. 2. As illustrated, the table 200 consists of three columns ("records"), each of which contains multiple entries. The columns are identified as STUDENT 202, YEAR 204, and GRADE 206. The STUDENT 200 column contains a plurality of character strings in each row ("field") that identifies the name of a student in a class. Similarly, the YEAR 204 and GRADE 206 columns contain character strings that identify a year in school of a student and the grade in the class that the student received, respectively. Those skilled in the art and others will recognize that FIG. 2 is a highly simplified example of one table 200 that may be included as part of a database.

For illustrative purposes and by way of example only an exemplary form 300 that is associated with the table 200 (FIG. 2) is depicted in FIG. 3. As illustrated, the form 300 includes a GUI element commonly known as a listbox 302 that contains a plurality of entries. More specifically, the entries in the STUDENT 202 column of the table 200 (FIG. 2) are the list items in the listbox 302 depicted in FIG. 3. Moreover, when a specific student is selected from the listbox 302, GUI elements commonly known as comboboxes 304 and 306 display the related YEAR 204 and GRADE 206 entries for the selected student. Those skilled in the art and others will recognize that the comboboxes 304 and 306 display entries from a database that may be selected by the user.

Application programs that use forms, such as the form 300 depicted in FIG. 3, may not allow users to easily modify entries in the forms. For example, in the context of the listbox 302 depicted in FIG. 3, a user may select different students that also appear in the STUDENT 202 column of the table 200 (FIG. 2). However, with existing systems, adding, deleting, and renaming students that appear in the listbox 302 may require employing a separate process or program. For example, a user may be required to access an underlying database in order to change entries that will appear in listbox 302. Alternatively, a user may be required to open and insert data in a separate form so that modifications are reflected in the underlying database.

Aspects of the present invention allow a user to modify entries presented in a GUI element without having to employ a separate process or program. Stated differently, the present invention provides a convenient way to modify entries that originate from an underlying database during the execution path of an application program. For example, in one embodiment of the present invention, a user may employ an input device to "right click" on the listbox 302. In response, a menu is presented with a menu item that, when selected, provides mechanisms for modifying data that is presented in the listbox 302.

As mentioned previously, aspects of the present invention allow the user to modify data items that are displayed in a GUI element. Typically, data items that are displayed in a GUI element are stored in a field or other unit of data in a database. When a GUI element will be displayed by an application program, a query is generated and passed to the database engine 106 so that data items bound to the GUI element may be retrieved from the database. Aspects of the present invention provide a way for users to modify data items that are displayed in a GUI element by inputting data in the underlying database from which the GUI element is bound. However, data items that are bound to the GUI element may be used by other components of the application program. For example, some Database Management Systems support the creation of reports which provide customized views of the data that are contained in fields and/or records in a database. In accordance with one aspect of the present invention, data that is bound to a GUI element may or may not be inherited by other components of an application program. For example, aspects of the present invention assign a property to data items that are bound to a GUI element. If the property is set to true, other components of application programs inherit any changes that are made. Alternatively, if the property is set to false, other components of an application programs do not inherit the change made to the data items.

Figure 4:
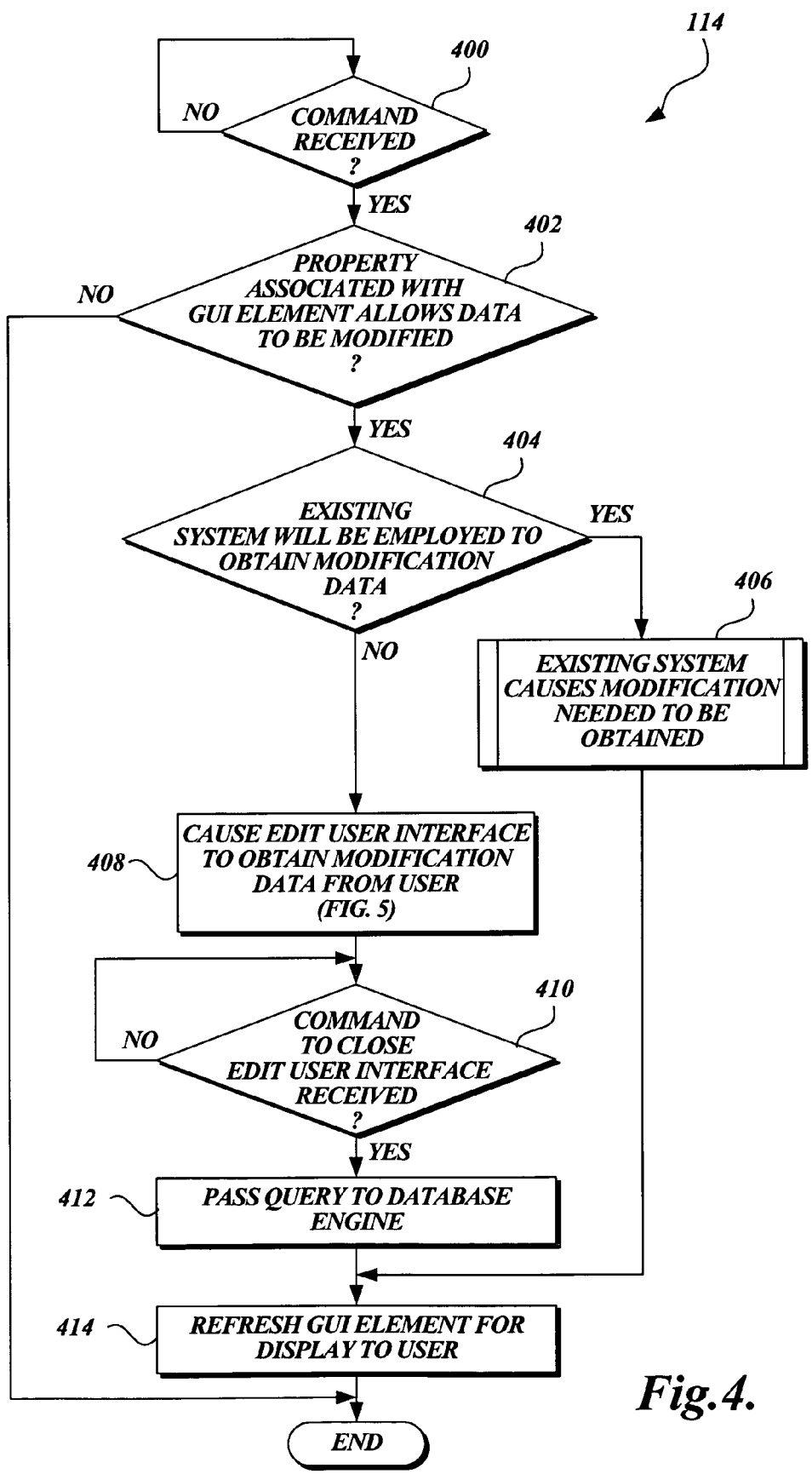
FIG. 4 is a pictorial depiction of an exemplary flow diagram for performing a method that modifies data displayed in a GUI element during the execution path of an application program.

Now with reference to FIG. 4, a flow diagram that illustrates one exemplary embodiment of the modification routine 114 that is also depicted in FIG. 1 will be described. As illustrated in FIG. 4, the modification routine 114 begins at decision block 400 where a command to modify data that is displayed in a GUI element is received. As mentioned previously, application programs may instantiate and use GUI elements to present and/or obtain information from users. In one embodiment of the present invention, when program execution causes a GUI element to be displayed, the user may generate a command to modify data in the GUI element. As used herein, the term modify means that the user may add, delete, and rename data items that are displayed in the GUI element.

As mentioned previously, one entry point for the user to modify data presented in a GUI element is by using an input device to generate a pointer selection event on the GUI element that will be modified. For example, a command to modify the data items in a GUI element may be generated when an input device (e.g., mouse, trackball, stylus, etc.) is used to "right-click" on a GUI element. In response, a menu is presented that contains selectable commands for adding, deleting, and/or renaming data items in the identified GUI element.

By way of another example, a command to modify data in a GUI element may be generated by default in instances when an unknown data item is entered by into a GUI element. For example, a combobox is a GUI element that allows users to manually enter a data item or select from a set of data items that are stored in an underlying database. A data item manually entered into the combobox may not match one of the items that is presented in the combobox. In one embodiment of the present invention, if a data item is entered into a combobox that does not match an existing data item, a dialog box is generated. The dialog box prompts the user for input regarding whether data presented in a GUI element should be modified. If the user indicates that data presented in the combobox needs to be modified, the command is handled by the modification routine 114.

While specific examples of ways in which a command may be generated to modify data in a GUI element have been described above, the command may be generated in different ways than described. For example, those skilled in the art and others will recognize that a command may be generated in an application program without requiring input from the user. Thus, the examples provided above should be construed as exemplary and not limiting.

At decision block 402, the modification routine 114 determines whether the GUI element that is the object of the command received a block 400 has properties that allow data in the GUI element to be modified. As mentioned previously, the present invention provides a standardized way of allowing data in a GUI element to be dynamically modified when presented to a user. In this regard, applications that use a GUI element derived from the application platform 104 (FIG. 1) may assign a variety of properties to the GUI element. For example, in accordance with one embodiment of the present invention, developers may assign a property to a GUI element that determines whether data that is bound to the GUI element may be modified. In some instances, it is desirable to allow data presented in a GUI element to be modified. For example, user-defined metadata may be presented in a GUI element that was obtained using a separate application or process. However, users may not know how to access the separate application or process. In other instances, a developer may not want data that is bound to a GUI element to be modified. Thus, the present invention adds a property to a GUI element that determines whether data bound to the GUI element may be modified. At block 502 the value of the property associated with the GUI element is identified using techniques that are generally known in the art. If the property associated with the GUI element indicates that data bound to the GUI element may be modified, the routine 114 proceeds to block 404. Conversely, if the property does not allow data bound to the GUI element to be modified, the routine 114 proceeds to block 416, where it terminates.

At decision block 404, the modification routine 114 determines whether the application program that caused the GUI element to be displayed to the user maintains an existing system for obtaining modification data from the user. As described previously with reference to FIG. 1, program execution may cause data that is stored in a database to be recalled and presented in a GUI element. When a user issues a command to modify data presented in a GUI element, an application program may have an existing system for obtaining the data. For example, in the context of FIGS. 2 and 3, an application program that causes the form 300 to be displayed may have an existing system to gather the identity of the students in a class and cause this data to be stored in the table 200 (FIG. 2). In this example, the existing system may be a separate form that has controls for manually entering the names of students in the class or the form may have controls that allow the user to identify a data store, such as a file or database, which contains the identity of the students in the class. In any event, the modification routine 114 may be implemented in the context of an application program that has existing systems for obtaining certain types of data from the user.

At block 404, the modification routine 114 determines whether the application program has an existing system to obtain the modification data by checking for a certain type of entry in a table. For example, in one embodiment, an application program may cause a "foreign key" value to be entered into a field of a table that contains data bound to a GUI element. Those skilled in the art and others will recognize that a "foreign key" is used to cross reference another table in the database. Moreover, when a foreign key is inserted into a table, the application program has a system, such as another form, for obtaining the data that is referenced by the foreign key. Thus, in one embodiment, the modification routine 114 determines whether an application program maintains an existing system to obtain the modification data by searching a portion of a database that stores data bound to a GUI element. If a foreign key value is found, then a system exists for obtaining the modification data from the user and the modification routine 114 proceeds to block 406. Conversely, if a foreign key value is not identified, then the modification data will be obtained by an "edit user interface" provided by the present invention. In this instance, the modification routine 114 proceeds to block 408, described in further detail below.

At block 406, an existing system causes the modification data to be obtained from the user and stored in a database. As mentioned previously, an application program may have an existing system for obtaining data that is displayed in a GUI element. For example, the existing system may be a form that is configured to allow the user to easily enter data into a database that is bound to a GUI element. At block 406, the modification routine 114 transfers the flow of program execution to a system that obtains the modification data from the user. Then, the modification routine proceeds to block 414, described in further detail below.

At block 408, the modification routine 114 causes an "edit user interface" that is provided by the present invention to be presented to the user. As described in further detail below with reference to FIG. 5, the edit user interface provides mechanisms for allowing the user to add, delete, and/or rename data items that are presented in a GUI element. Moreover, when changes are made to data items using the edit user interface, the changes are also reflected in an underlying database that stores the data items. In this way, data items in a database that are bound to the GUI element may be modified in the execution path of an application program.

Figure 5:
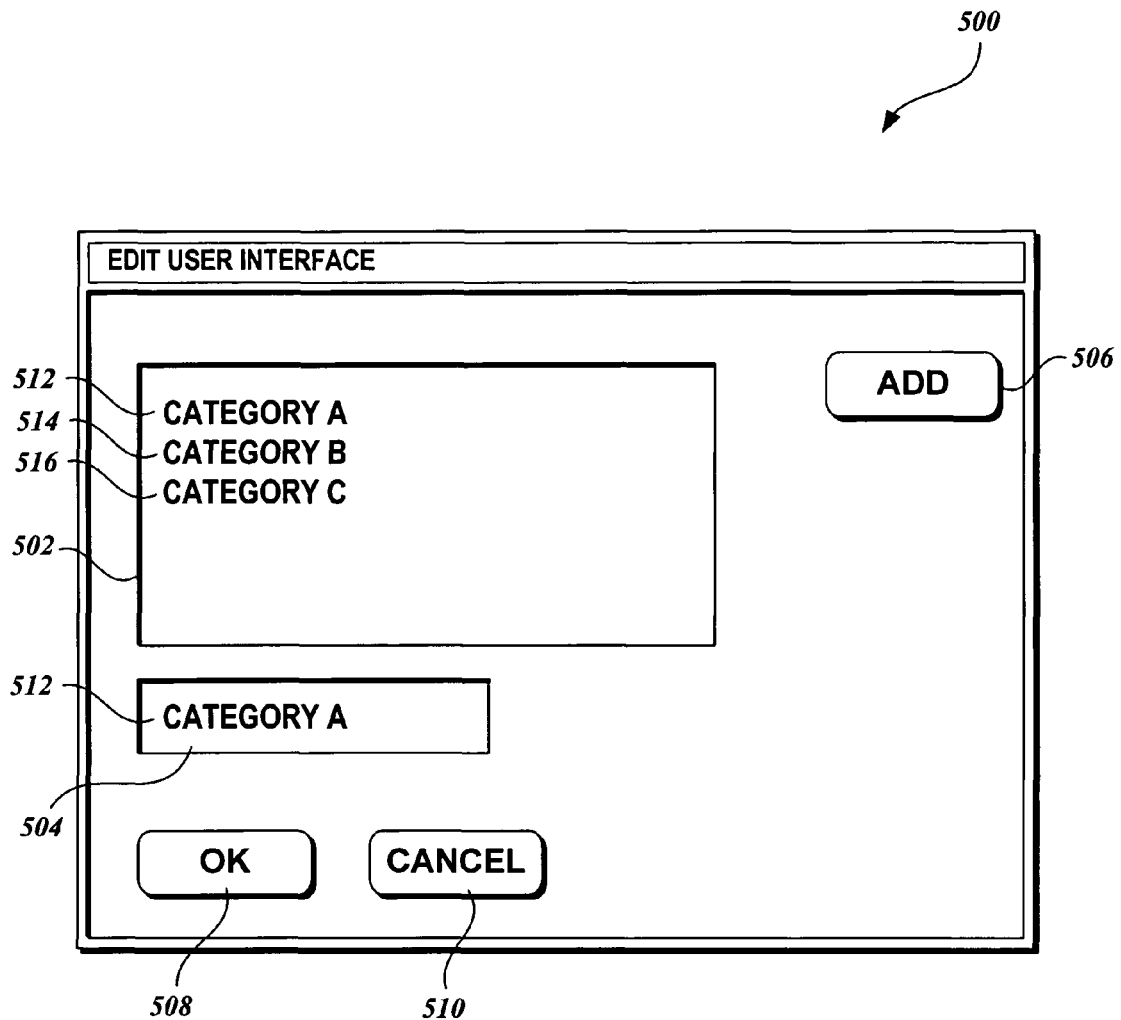
FIG. 5 is a pictorial depiction of an exemplary edit user interface that allows the user to modify data that is bound to a GUI element.

For illustrative purposes and by way of example only, an exemplary edit user interface 500 that may be presented to the user, at block 408, is depicted in FIG. 5. As illustrated, the exemplary edit user interface 500 includes a data item textbox 502, a default textbox 504, and control buttons 506, 508, and 510 that are entitled "ADD," "OK," and "CANCEL", respectively. Generally described, the data item textbox 502 is an input mechanism that allows the user to select one or more of the data items presented in the textbox 502. For example, when the edit user interface 500 is displayed, the data items 510, 512, and 514 entitled "CATEGORY A," "CATEGORY B," and "CATEGORY C," may be selected by the user. The data items that are initially presented in the text box 502 will typically be the same data items that are in the GUI element. If a data item is selected from the text box 502, the user may issue a command to delete or rename the data item; for example, by "right clicking" on the data item and selecting a command from a menu. Moreover, by selecting the control button 506 entitled "ADD," the user may add a data item to the text box 502 that will now be presented in the associated GUI element.

As illustrated in FIG. 5, additional features of the edit user interface 500 may include a default textbox 504 in which the user may identity a list item in the a GUI element that will be displayed as the default selection. Moreover, the edit user interface 500 includes control buttons 508 and 510 entitled "OK" and "CANCEL" that allow the user to close the edit user interface 502 with or without modifying data items in a GUI element.

As illustrated in FIG. 4, at decision block 410, the modification routine 114 remains idle and waits for the edit user interface presented to the user at block 408 to be closed. The edit user interface 500 may be used to modify data that is stored in a database and bound to a GUI element. When the user is finished making modifications, a command may be issued by, for example, activating one of the control buttons 508 or 510. However, those skilled in the art and others will recognize that data may be input into the computer using different techniques and that the examples described above should be construed as exemplary not limiting.

At block 412, the modification routine 114 generates a query and passes the query to a database engine. As mentioned previously, a database engine may be used to extract data from a database that matches certain characteristics. In this instance, a query designed to extract the data items bound to the GUI element that is the object of the command received a block 400 is generated. In response, the database engine extracts the data items, including any new data items input using the edit user interface 500.

As illustrated in FIG. 4, at block 414 the modification routine 114 causes the GUI element that is this object of the command received at block 400 to be "refreshed." Stated differently, data items bound to a GUI element including any modified data items are displayed to the user. However, since "refreshing" a GUI element may be performed using techniques that are generally known of the art, further description of the techniques performed at block 414 will not be provided here.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a computer that includes a database for storing data and an application program that displays a graphical user interface element associated with a plurality of data items from the stored data, a method of dynamically updating the data items that are displayed in the graphical user interface element, the method comprising:
  receiving a command to modify the data items when the graphical user interface element is displayed;
  obtaining input that identifies how the displayed data items are to be modified, wherein obtaining the input comprises:
    checking for a foreign key value in a first portion of the database, the foreign key being used to cross reference a second portion of the database, and
    in response to a determination the foreign key value exists, transferring program execution to an existing system in order to obtain the input, the existing system being referenced by the foreign key and being used to obtain the input that identifies how the displayed data items are to be modified, wherein the existing system being used to obtain the input comprises the existing system being configured to allow for an entry of the input into the database;
  automatically changing the data items stored in the database that are bound to the graphical user interface element to reflect the input that identifies how the data items are to be modified; and
  in response to determining that the stored data items have been changed, refreshing the graphical user interface element so that the changed data items bound to the graphical user interface element are displayed.

2. The method as recited in claim 1, further comprising receiving a selection from a user to update the data items that are displayed in the graphical user interface element.

3. The method as recited in claim 1, wherein receiving the command to modify the data items comprises receiving the command when a pointer selection event is generated on the graphical user interface element.

4. The method as recited in claim 1, wherein receiving the command when the pointer selection event is generated on the graphical user interface element comprises receiving the command when the pointer selection event is generated on the graphical user interface element comprising a combobox, the command being generated by default when new data is entered into the combobox that does not match any data item that is displayed in the combobox.

5. The method as recited in claim 1, wherein the graphical user interface element has an associated property that is operable to be set in order to prevent modification of the data items; and
  wherein receiving the command includes determining whether the property is set to prevent modification of the data items.

6. The method as recited in claim 1, wherein obtaining the input that identifies how the data items are to be modified comprises presenting an edit user interface to the user.

7. The method as recited in claim 6, wherein presenting the edit user interface to the user comprises allowing the user to input modification data for at least one of the following: adding, deleting, and renaming the data items presented in the graphical user interface element.

8. The method as recited in claim 1, wherein refreshing the graphical user interface element so that data items bound to the graphical user interface element are displayed comprises:
  generating a structured query language query that identifies the data items bound to the graphical user interface element; and
  passing the structured query language query to a database engine.

9. The method as recited in claim 8, wherein passing the structured query language query to the database engine comprises passing the structured query language query to the database engine operative to extract the data items bound to the graphical user interface element and cause the data items to be passed to the application program.

10. The method as recited in claim 1, further comprising providing a listbox in the graphical user element, wherein a data item contained in a field of a table is bound to the listbox.

11. A computing device capable of executing a software system for dynamically updating a data item presented in a graphical user interface element in the execution path of an application program, the computing device comprising:
   a memory;
   a central processing unit coupled to the memory, wherein the central processing unit is configured to:
      execute the software system comprising:
         an application platform operative to provide services to the application program including services for building the graphical user interface element and storing data in a database;
         a modification routine operative to:
            communicate with a database operative to store the data item, the data item being bound to the graphical user interface element;
            obtain modification data, wherein the modification routine being operative to obtain the modification data comprises the modification routine being operative to:
               check for a foreign key, the foreign key being configured to identify a relationship of the bound data item in the database with other data in one of: the database and other databases,
               when the foreign key exists, obtain the modification data from a system associated the foreign key, the system being configured to allow a user to enter the modification data into the database,
               when the foreign key does not exist, the modification routine being operative to:
                  receive a first data item manually,
                  determine whether the manually received first data item matches any one data item from the plurality of stored data items,
                  generate a dialog for input to indicate that the manually received first data item is modifiable,
                  receive a selection of a second data item from the plurality of stored data items, and
                  obtain the modification data from an existing system by checking for a certain type of entry in a table associated with the database, the certain type of entry comprising the foreign key used to cross reference another table in the database;
            automatically store the modification data in a unit of the database that is bound to the graphical user interface element; and
            cause the graphical user interface element to display the modified data item bound to the graphical user interface element from the database.

12. The computing device of claim 11, wherein the central processing unit is further configured to execute a database engine for managing access to the database, wherein managing access to the database includes causing data to be stored and extracted from the database when an appropriate request is issued from the application platform.

13. The computing device of claim 12, wherein the modification routine causes the graphical user interface element to display the data bound to the graphical user interface element in the database by:
   passing a structured query language query to the database engine;
   receiving a result set of the structured query language query from the database engine; and
   passing the result set to the application program.

14. The computing device of claim 11, wherein the application platform includes an operating system for managing access to hardware resources on the computing device, wherein managing access to the hardware resources on the computing device includes resources that allow data to be stored on the memory.

15. The computing device of claim 11, wherein the application platform includes an extensible application program from which the application program is enabled to use existing systems for storing data in the database and interacting with the user.

16. The computing device of claim 11, wherein the modification routine uses an edit user interface to obtain the modification data from the user that describes how the data item presented in the graphical user interface element is to be updated.

17. A computer-readable storage device containing computer-readable instructions which, when executed in a computer that includes a database for storing textual data and an application program that displays a graphical user interface element associated with a plurality of data items from the stored data, perform a method of dynamically updating the data items that are displayed in the graphical user interface element in response to receiving a command to modify the data items, the method executed by the set of instructions comprising:
   obtaining input that identifies how the data items are to be modified, wherein obtaining the input comprises:
      searching for a foreign key configured to identify a relationship of the bound data items in the database with other data in one of: the database and other databases, wherein searching for the foreign key comprises searching a portion of the database for a certain type of value within a field of the database,
      when the foreign key exists, obtaining the modification data from an existing system associated with the foreign key, the existing system having controls for at least one of the following:
         manually entering data associated with the modification data, and
         identifying a data store that that contains the modification data;
   automatically storing the modification data in a unit of the database that is bound to the graphical user interface element;
   in response to determining the modification data has been stored in the unit of the database, refreshing the graphical user interface element so that the modified data items bound to the graphical user interface element are displayed; and
   maintaining a property at the graphical user interface element for identifying whether other components of the application program use the modification data received from the user.

18. The computer-readable medium as recited in claim 17, wherein refreshing the GUI element so that data bound to the graphical user interface element is displayed includes:
   generating a structured query language query that identifies the data bound to the graphical user interface element;
   passing the structured query language query to a database engine;
   receiving a result set of the structured query language query from the database engine; and
   passing the result set to the application program.

19. The method of claim 1, wherein obtaining the input further comprises:
   receiving an input data item manually;

in response to receiving the input data item manually, determining whether the manually received input data item matches any one data item from the plurality of stored data items; and in response to determining that the manually received input data item does not match any one data item from the plurality of data items, generating a dialog for the input to indicate that the manually received input data item is modifiable.

20. The computer-readable medium of claim 1, wherein obtaining the input further comprises:

receiving an input data item manually;

in response to receiving the input data item manually, determining whether the manually received input data item matches any one data item from the plurality of stored data items; and in response to determining that the manually received input data item does not match any one data item from the plurality of data items, generating a dialog for the input to indicate that the manually received input data item is modifiable.

* * * * *